(12) United States Patent
Wang

(10) Patent No.: US 9,372,508 B2
(45) Date of Patent: Jun. 21, 2016

(54) FLEXIBLE DISPLAY DEVICE AND METHOD FOR THE SAME CAPABLE OF REDUCING ACCIDENTAL CONTACT-INDUCED MALFUNCTIONS

(75) Inventor: Tzu-Ming Wang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 365 days.

(21) Appl. No.: 12/897,141

(22) Filed: Oct. 4, 2010

(65) Prior Publication Data

US 2012/0019482 A1    Jan. 26, 2012

(30) Foreign Application Priority Data

Jul. 21, 2010    (TW) ............................... 99124013 A

(51) Int. Cl.
   *G06F 3/042* (2006.01)
   *G06F 1/16* (2006.01)

(52) U.S. Cl.
   CPC .................................... *G06F 1/1652* (2013.01)

(58) Field of Classification Search
   USPC .............. 345/175, 173, 174; 455/566; 356/28
   See application file for complete search history.

(56) References Cited

U.S. PATENT DOCUMENTS

| | | | |
|---|---|---|---|
| 7,081,888 B2 * | 7/2006 | Cok et al. ....................... | 345/173 |
| 7,126,588 B2 * | 10/2006 | Oakley ............................ | 345/169 |
| 7,184,086 B2 * | 2/2007 | Tamura ..................... | 348/333.06 |
| 7,683,606 B2 * | 3/2010 | Kang et al. ................ | 324/754.23 |
| 8,097,812 B2 * | 1/2012 | Wang et al. ................... | 174/254 |
| 8,154,523 B2 * | 4/2012 | Miller .................... | G06F 3/0488 345/173 |
| 2001/0034249 A1 * | 10/2001 | Peuhu et al. ................... | 455/566 |
| 2002/0041262 A1 * | 4/2002 | Mukai ................... | G06F 1/1613 345/30 |
| 2003/0050019 A1 * | 3/2003 | Dowling .............. | H04B 1/3833 455/575.1 |
| 2003/0098857 A1 * | 5/2003 | Gettemy et al. ............... | 345/173 |
| 2003/0142288 A1 * | 7/2003 | Kinrot et al. .................... | 356/28 |
| 2005/0040962 A1 * | 2/2005 | Funkhouser .......... | G06F 1/1601 340/815.4 |
| 2009/0153438 A1 | 6/2009 | Miller et al. | |
| 2010/0141605 A1 * | 6/2010 | Kang ..................... | G06F 1/1626 345/174 |
| 2010/0194785 A1 * | 8/2010 | Huitema et al. .............. | 345/690 |
| 2012/0019482 A1 * | 1/2012 | Wang ............................ | 345/175 |
| 2012/0182265 A1 * | 7/2012 | Smith et al. .................... | 345/175 |

FOREIGN PATENT DOCUMENTS

| | | |
|---|---|---|
| CN | 101681038 A | 3/2010 |
| TW | 200849170 | 12/2008 |

(Continued)

OTHER PUBLICATIONS

"Office Action of Taiwan Counterpart Application", issued on Aug. 30, 2013, p. 1-p. 9.

(Continued)

*Primary Examiner* — Gerald Johnson
*Assistant Examiner* — Robert Michaud
(74) *Attorney, Agent, or Firm* — Jianq Chyun IP Office

(57) ABSTRACT

A flexible display device includes a base, a flexible display panel, a detecting unit and a control unit. The flexible display includes a touch control unit that could be exposed outside of or received within the base. The detecting unit is used to detect the operating state of the flexible display panel. Then, the control unit controls the touch control unit according to a detected result of the detecting unit. Accordingly, the flexible display device according to the present invention may effectively reduce the accidental contact-induced malfunctions.

8 Claims, 5 Drawing Sheets

(56) References Cited

FOREIGN PATENT DOCUMENTS

| | | |
|---|---|---|
| TW | 201005701 | 2/2010 |
| TW | 201022901 | 6/2010 |

OTHER PUBLICATIONS

Communication From the Chinese Patent Office Regarding a Counterpart Foreign Application Dated Jan. 31, 2013.

* cited by examiner

FLEXIBLE DISPLAY DEVICE AND METHOD FOR THE SAME CAPABLE OF REDUCING ACCIDENTAL CONTACT-INDUCED MALFUNCTIONS

BACKGROUND OF THE INVENTION

1. Field of the Invention

The present invention relates to a display device; in particular, to a flexible and touch-sensitive display device and a method for the same that is capable of minimizing accidental contact-induced malfunctions.

2. Description of Related Art

Portability has been a hot trend in the current development for electronic devices. However, the portability is often achieved at the expense of the size of a display screen of the electronic devices, which may not offer quality viewing experience.

Soft liquid crystal display technology was developed at least for the purpose of offering a solution to the above-mentioned problem.

Also, the touch-sensitive input technology has been widely incorporated into a variety of electronic devices so as to reduce the overall number of buttons configured on electronic devices, releasing more space for the placement of the display screen of a larger size.

In view of the aforementioned technologies, some conventional electronic devices have them utilized together. For example, a conventional electronic device is equipped with a flexible/foldable display panel providing a touch-sensitive input functions so that the size of the display screen is not compromised. Such electronic device, however, is subject to accidental contact-based inputs, which cause malfunctions on the part of the electronic device. For example, when the flexible display panel is in the process of being received, the flexible display panel itself may be in contact with other objects, which may generate the unintended contact-based inputs.

SUMMARY OF THE INVENTION

In view of the aforementioned objectives, the present invention provides a flexible display device and a method for the flexible display device that is capable of minimizing accidental contact-induced malfunctions.

According to an embodiment of the present invention, a flexible display device is provided. The flexible display device includes a base, a flexible display panel, a detecting unit, and a control unit. The flexible display panel couples to the base and has a touch control unit, and the detecting unit is configured to detect an operating state of the flexible display panel. The control unit is disposed inside the base and electrically coupled to the detecting unit. And the control unit controls operation functions of the touch control unit in response to a detected result generated from the detecting unit.

According to another embodiment of the present invention, a method for the flexible display device that is capable of minimizing accidental is provided. The flexible display device includes a base and a flexible display panel with a touch control unit. The method includes detecting an operating state of the flexible display panel, and controlling operation functions of the touch control unit according to the detected operating state.

When the detected operating state indicates that the flexible display panel is received within the base and is in a first operating state, the operation functions of the touch control unit are turned off.

On the contrary, while the detected operating state indicates that the flexible display panel is pulled out from the base and is in a second operating state, the operation functions of the touch control unit are activated.

Consequently, the following efficacy of aforementioned technical proposal of the present invention is achieved: the operation of the flexible display panel can be either activated or turned off depending on whether the operation functions of the touch control unit are activated or turned off in accordance with the operating state of the flexible display panel. Therefore, occurrence of accidental contacts that may lead to accidental contact-induced malfunctions of the flexible display panel may be minimized.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

The present invention provides a flexible display device which has a display panel that is retractable so that the occurrence of the accidental contact-induced malfunctions may be minimized. To achieve the aforementioned objective, a detecting mechanism is provided to determine whether a contact (or a touch-sensitive input) is a normal input or abnormal input. Accordingly, the operation functions of the touch control unit of the flexible display panel could be activated or turned off.

Figure 1A:
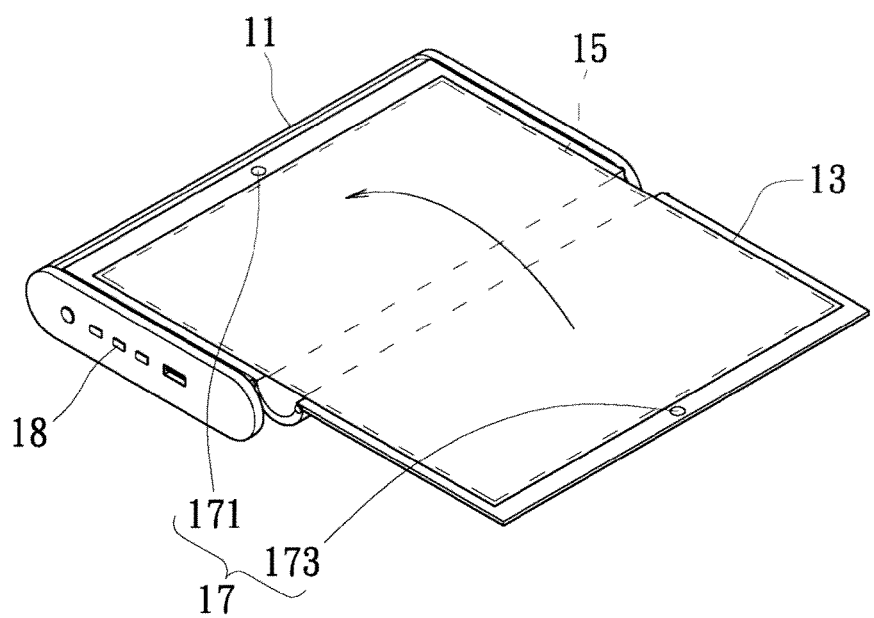
FIG. 1A illustrates a schematic diagram of an embodiment.
Figure 1B:
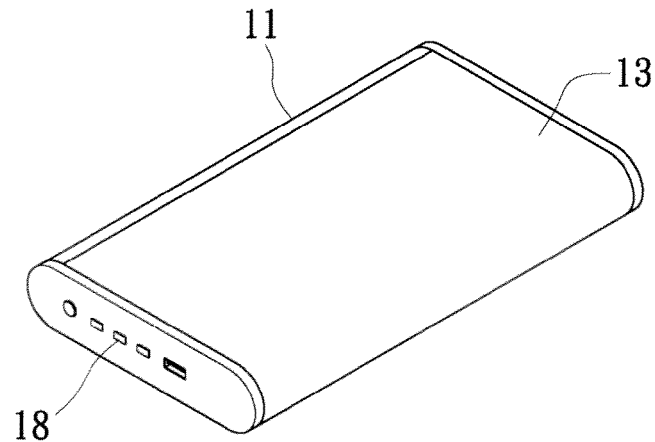
FIG. 1B illustrates a schematic diagram of the embodiment in accordance with the flexible display device in a concealing mode a in accordance with the flexible display device in an exposing mode according to the present invention according to the present invention.

Please refer to FIG. 1A and FIG. 1B, in which schematic diagrams of an embodiment in accordance with the flexible display device in an exposing mode and concealing mode according to the present invention are shown. In one implementation, the exposing mode and the concealing mode are examples of the operating state of a flexible display panel 13, which is included in a flexible display device 1. And the flexible display device 1 further includes a base 11 coupled to the flexible display panel 13. The flexible display panel 13 may be pulled out from the base 11 and on one side of the base 11 in the exposing mode as shown in FIG. 1A or be received into one side of the base 11 in the concealing mode as shown in FIG. 1B.

In one implementation, the flexible display panel 13 is received within the base 11 by folding. For example, the flexible display panel 13 is folded in half or several times. The flexible display panel 13 may be an electronic display panel which applied soft crystal display technology, e.g., an electronic paper display panel. Additionally, the flexible display panel 13 provides a touch control unit 15 for enabling inputs. The touch control unit 15 may be bended or folded along with the flexible display panel 13. The base 11 may include a button unit 18 disposed thereon.

In FIG. 1A, a detecting unit 17 is configured to detect an operating state, e.g., an exposing mode or a concealing mode, of the flexible display panel 13. The detecting unit 17 may be positioned at a predetermined location so long as the detecting unit 17 is able to detect the operating state of the flexible display panel 13. For example, the detecting unit 17 in FIG. 1A may further include a photo-emitter 171 and a photo-detector 173. The photo-emitter 171 and the photo-detector 173 may be disposed respectively on two sides of the flexible display panel 13. When the flexible display panel 13 is in the process of being received into the base 11 (such as being folded in half), the photo-detector 173 may detect a light emitting signal outputted from the photo-emitter 171.

Additionally, the photo-emitter 171 and the photo-detector 173 may be disposed adjacently on the same side of the flexible display panel 13. Under that arrangement, when the flexible display panel 13 is in the process of being received into the base 11, the light emitting signal outputted from the photo-emitter 171 may be reflected to the photo-detector 173 by the flexible display panel 13 or the base 11.

Figure 2:
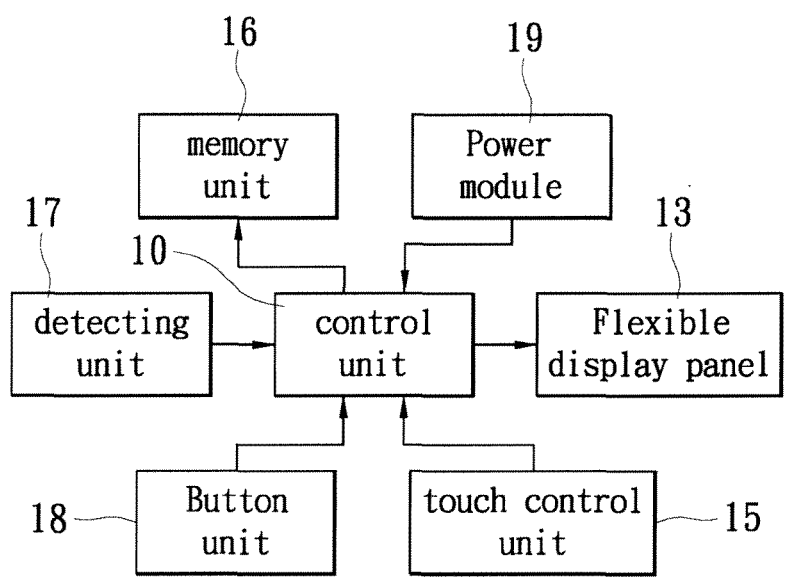
FIG. 2 demonstrates a block diagram of the embodiment associated with a flexible display device in accordance with the present invention.

Please refer to FIG. 2 in conjunction with FIG. 1, in which a block diagram of the embodiment associated with the flexible display device in accordance with the present invention is demonstrated. The flexible display device 1 comprises a control unit 10, a flexible display panel 13, a touch control unit 15, a detecting unit 17, a button unit 18, a memory unit 16, and a power module 19.

The control unit 10 is disposed in the base for controlling the operations of the flexible display device 1.

The flexible display panel 13 displays information and is controlled by the control unit 10. The displayed information of the flexible display panel 13 is stored in the memory unit 16.

The touch control unit 15 generates a touch control input signal to the control unit 10 in response to a touch control input, so that the control unit 10 may control the operations of the flexible display device according to the touch control input signal. The touch control unit 15 may be implemented as a combination of a touch control screen and a location determination circuit. The technical features of the touch control unit are well known, therefore, no detail descriptions are enclosed herein.

The button unit 18 when pressed may input a button signal to the control unit 10, so that the control unit 10 can process according to the button signal.

The detecting unit 17 is used to detect whether the flexible display panel 13 is in the exposing mode and output a corresponding detected signal indicative of a detected result that the flexible display panel is in the exposing mode (or in the second operating state) to the control unit 10. Thus, the control unit 10 may determine whether to activate or turn off the operation functions of the touch control unit 15 according to the detected signal.

The power module 19 may supply the required power for the operations of the flexible display device 1.

When the flexible display panel 13 operates properly in which, the flexible display panel 13 is in the exposing mode so that the information on the flexible display panel 13 could be viewed. Therefore, the control unit 10 may be notified that whether the operating state of flexible display panel 13 is in according to the detected result of the detecting unit 17. For example, as the flexible display panel 13 is in the exposing mode, the control unit 10 receives the detected result indicating the second operating state (e.g., exposing mode) of the flexible display panel 13 through the detecting unit 17 and activates the operation functions of the touch control unit 15. On the other hand, as the flexible display panel 13 is received, the control unit 10 receives the detected result indicative of the first operating state (e.g., concealing mode) through the detecting unit 17 and turns off the operation functions of the touch control unit 15.

In other words, when the flexible display panel 13 is received the operation functions of the touch control unit 15 is turned off to reduce or even eliminate the occurrences of any accidental contact-induced malfunctions arising out of the accidental contacts on the touch control unit 15. Additionally, more power may be saved as the result.

Figure 3:
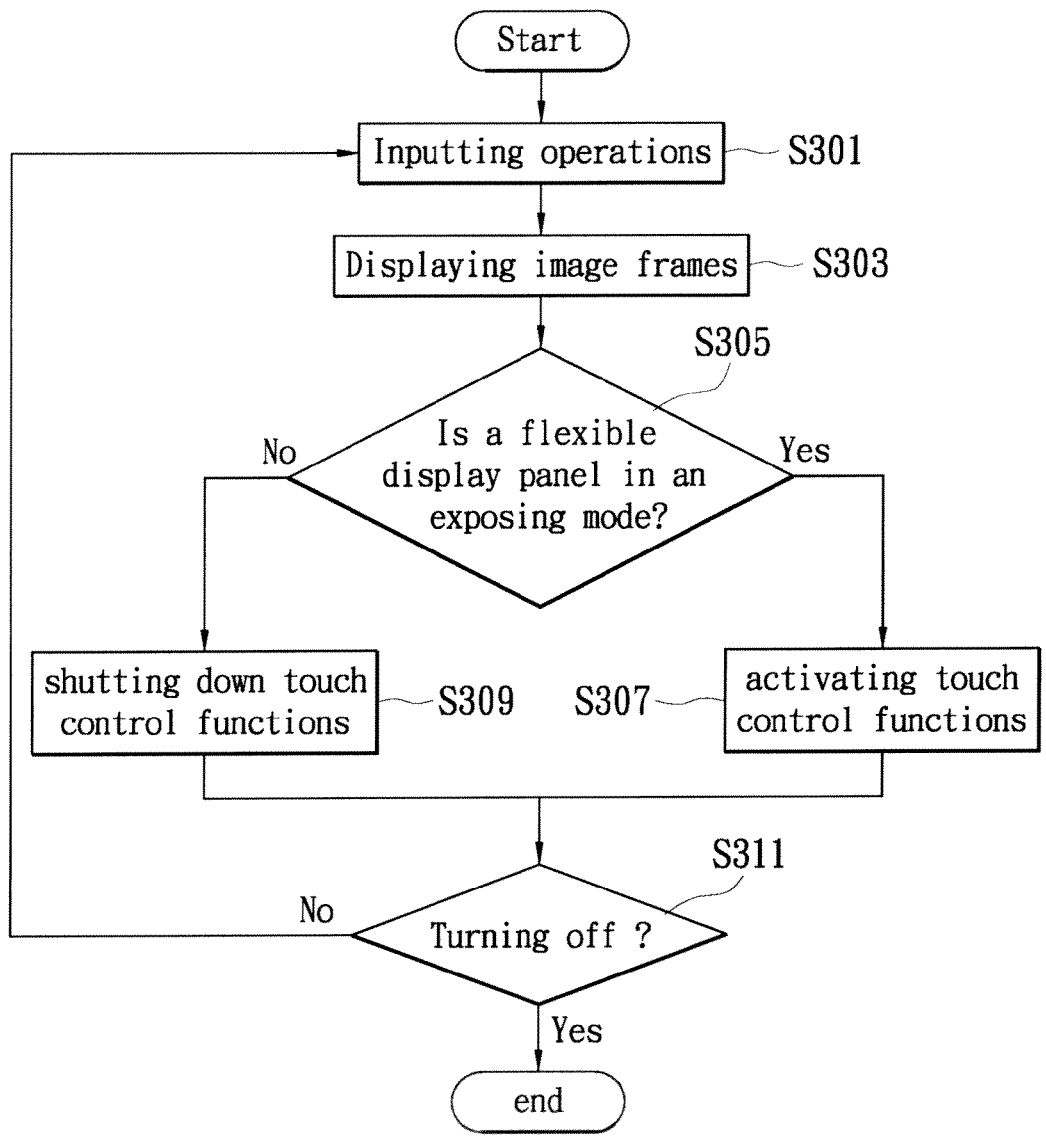
FIG. 3 demonstrates a flowchart illustrating a method for a flexible display device that is capable of reducing accidental contact-induced malfunctions according to the present invention.

Please refer to FIG. 3 in conjunction with FIG. 1A, FIG. 1B and FIG. 2, in which a flowchart of another flexible display device according to the present invention that is capable of reducing the accidental contact-induced malfunctions is demonstrated.

When the flexible display device 1 is turned on, the flexible display device 1 may perform operations corresponding to contact-based inputs on the touch control unit 15 in step S301 and display the information in step S303.

The operating state of the flexible display panel 13 is determined in step S305. When the flexible display panel 13 is in the concealing mode, the flexible display panel 13 may be operating in the first operating state while the flexible display panel 13 in the exposing mode the flexible display panel 13 may be considered as operating in the second operating state.

When step S305 determines the flexible display panel operates in the second operating state, the process shown in FIG. 3 proceeds to step S307 allowing for the operation function of the touch control unit 15 to be activated.

Otherwise, when the flexible display panel operates in the first operating state the process in FIG. 3 proceeds to step S309 for turning off the operation function of the touch control unit 15.

After step S307 or step S309, the process determines whether the flexible display device 1 is turned off in step S311, and if the determination is yes, the process ends. Otherwise, the process goes back to step S301.

Moreover, when step S309 is performed the information displayed on the flexible display panel 13 may be recorded simultaneously. As such, when the flexible display device 1 is turned on again the information displayed before the flexible display device 13 is turned off may be displayed again.

In the aforementioned flowchart as shown in FIG. 3, the flexible display device 1 may be an electronic book reading device or a multimedia electronic device. The order of the aforementioned steps is used as an example for illustration, but is not limited thereto.

Although through the aforementioned descriptions, technical characteristics of the present invention are described in detail, the configuration of the detecting unit 17 in accordance with the present invention is not limited to the same demonstrated in FIG. 1A and FIG. 1B. Additional embodiments illustrating the configuration of the detecting unit 17 are presented in the below.

Figure 4A:
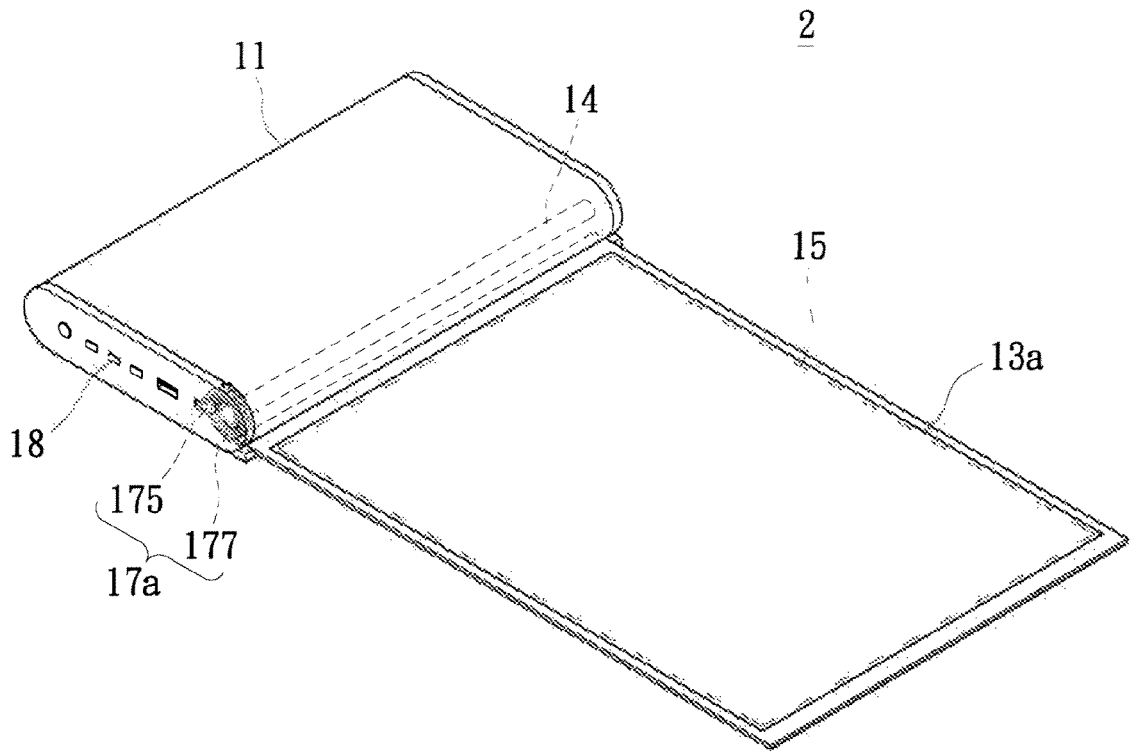
FIG. 4A illustrates a schematic diagram of yet another embodiment in accordance with the flexible display device in an exposing mode according to the present invention.
Figure 4B:
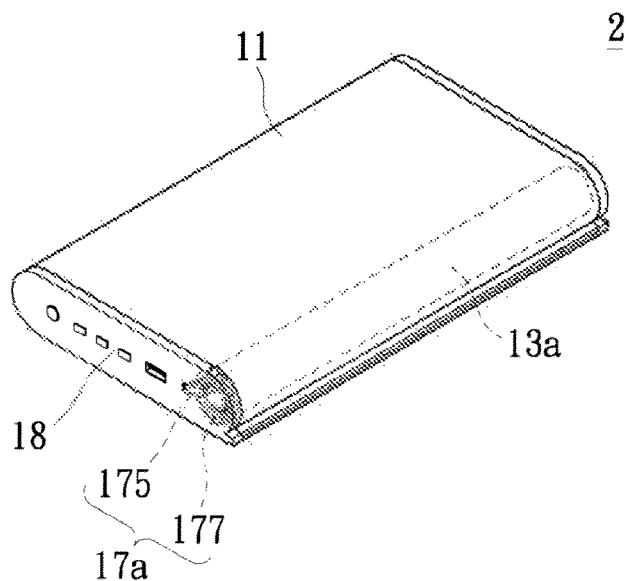
FIG. 4B illustrates a schematic diagram of the yet another embodiment in accordance with the flexible display device in a concealing mode according to the present invention.

Please refer to FIG. 4A and FIG. 4B, a flexible display panel 13a of a flexible display device 2 may be exposed or received through a scrolling unit 14. One side of the flexible display panel 13a couples to a scrolling unit 14 and electrically couples to an internal circuit (not shown) inside the base 11. The scrolling unit 14 is for scrolling the flexible display panel 13a. Therefore, when the flexible display panel 13a is to be in the second operating state, the flexible display panel 13a may be pulled out of the base 11 by the scrolling unit 14. As shown in FIG. 4A, the flexible display panel 13a is in the exposing mode. When the flexible display panel 13a is to be in the first operating state, the flexible display panel 13a may be received into the base 11 by the scrolling unit 14 as well. As shown in FIG. 4B, the flexible display panel 13a is in a concealing mode.

A detecting unit 17a, which may be a light detecting module, may be disposed on one side of the scrolling unit 14. The detecting module may include a photo-detector 175 and an optical grating 177. The optical grating 177 may rotate along with the scrolling unit 14 simultaneously. The photo-detector 175 is configured to identify a rotating direction and a number of rotations for the optical grating 177 so as to determine whether the flexible display panel 13a is being pulled out of the base 11 or received into the base 11.

Figure 5A:
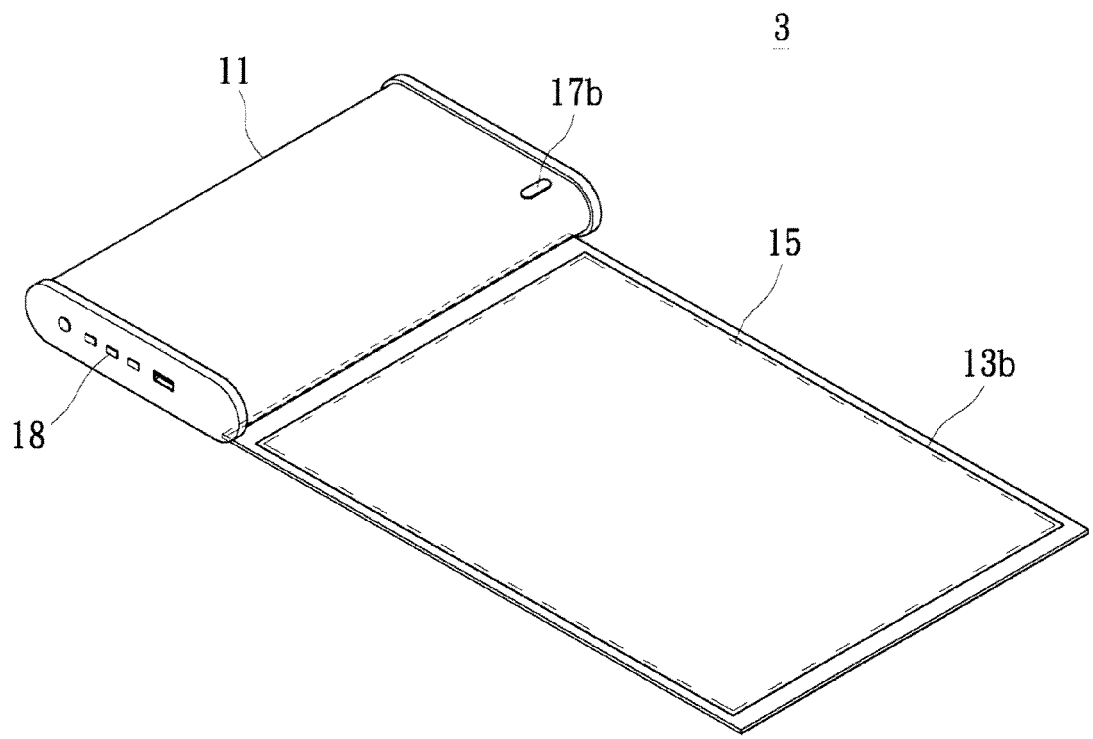
FIG. 5A illustrates a schematic diagram of further another embodiment in accordance with the flexible display device in an exposing mode according to the present invention.
Figure 5B:
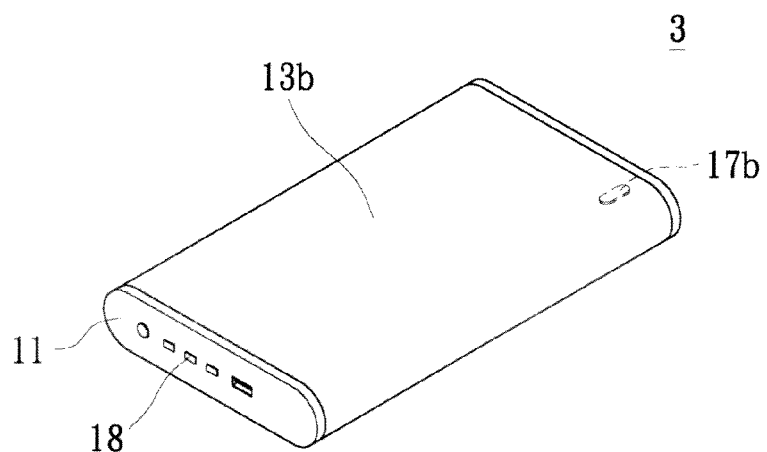
FIG. 5B illustrates a schematic diagram of the further another embodiment in accordance with the flexible display device in a concealing mode according to the present invention.

Please refer to FIG. 5A and FIG. 5B, a flexible display panel 13b of a flexible display device 3 is received on one side of the base 11 through an approach of winding. The flexible display panel 13b is pivotally coupled to one side of the base 11. When the flexible display panel 13b is in the second operating state, the flexible display panel 13b may spread from the base 11, as shown in FIG. 5A. When the flexible display panel 13b is in the first operating state, the flexible display panel 13b may be wrapped around the base 11 and adhesively attached to the base 11 as shown in FIG. 5B.

Therefore, as to the embodiments shown in FIG. 5A and FIG. 5B, the detecting unit 17b may be a touch-sensitive switch disposed on the surface of the base 11 and positioned at a predetermined position so that the touch-sensitive switch may be in contact with the flexible display panel 13b as the flexible display panel 13b is in the first operating state. On the other hand, as the touch-sensitive switch is no longer in contact with the flexible display panel 13b, the flexible display panel 13b may be operating is the second operating state.

According to the aforementioned embodiments shown in FIG. 4 and FIG. 5, when the control unit 10 inside the base 11 receives the detected results of the detecting unit 17a, and 17b, the subsequent steps performed by the control unit 15 may be the same as that described in the embodiment shown in FIG. 1.

Additionally, the aforementioned detecting methods may be applicable to a variety of detecting units and are not limited thereto.

Therefore, in view of the aforementioned embodiments, the flexible display device and the method for the flexible display device that is capable of minimizing the accidental contact-induced malfunctions in accordance with the present invention may effectively reduce the occurrences of the malfunctions arising out of the accidental contacts. Furthermore, by turning off the operation function of the flexible display device a better power consumption performance may be achieved.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A flexible display device, comprising:
  a base;
  a flexible display panel coupled to the base and having a touch control unit, wherein the touch control unit is located on a display area of the flexible display panel;
  a detecting unit, for detecting an operating state of the flexible display panel, wherein the operating state comprises a concealing mode and an exposing mode; and
  a control unit, disposed inside the base and electrically coupled to the detecting unit, wherein the detecting unit outputs a detected signal indicative of a detected result to the control unit, and the control unit is configured to determine whether to activate or turn off operation functions of the touch control unit according to the detected signal to minimize accidental contact-induced malfunctions, wherein when the operation functions of the touch control unit is turned off, display information of the flexible display panel is recorded, and the operation functions of the touch control unit are activated or turned off in accordance with the operating state of the flexible display panel,
  wherein as the detecting unit detects that the flexible display panel is in the concealing mode, the control unit turns off the operation functions of the touch control unit.

2. The flexible display device according to claim 1, wherein the detecting unit includes a photo-emitter and a photo-detector, wherein the photo-detector senses a light emitting signal outputted from the photo-emitter, the control unit turns off the operation functions of the touch control unit.

3. The flexible display device according to claim 2, wherein the photo-emitter and the photo-detector are disposed on the flexible display panel and the photo-detector is positioned in accordance with a position of the photo-emitter when the photo-emitter so that the photo-detector receives the light emitting signal outputted from the photo-emitter when the flexible display panel is in an exposing mode.

4. The flexible display device according to claim 1, wherein the detecting unit is a touch-sensitive switch and the touch-sensitive switch is positioned to be contactable with the flexible display panel as the flexible display panel is in the concealing mode.

5. The flexible display device according to claim 1, wherein the detecting unit includes a photo-detector and an optical grating, wherein the optical grating is configured to rotate simultaneously along with a scrolling unit of the flexible display panel and the photo-detector is configured to identify a rotating direction and a number of rotations of the optical grating so as to determine whether the flexible display panel is pulled outside of the base or received into the base.

6. The flexible display device according to claim 1, wherein as the detecting unit senses that the flexible display panel is in the exposing mode, the control unit activates the operation functions of the touch control unit.

7. An method for a flexible display device to minimize accidental contact-induced malfunctions, the flexible display device including a base and a flexible display panel, with a touch control unit, the method comprising:

detecting an operating state of the flexible display panel to output a detected signal indicative of a detected result, wherein the operating state comprises a concealing mode and an exposing mode;

determining whether to activate or turn off operation functions of the touch control unit according to the detected signal to minimize accidental contact-induced malfunctions, wherein the operation functions of the touch control unit are activated or turned off in accordance with the operating state of the flexible display panel, and the touch control unit is located on a display area of the flexible display panel;

when the operation functions of the touch control unit is turned off, recording display information of the flexible display panel; and as the detected result indicates the flexible display panel is received inside the base and is in the concealing mode, turning off the operation function of the touch control unit.

8. The method according to claim 7, further comprising when the detected result indicates the flexible display panel is outside of the base and is in the exposing mode activating the operation function of the touch control unit.

* * * * *